United States Patent [19]
Brane et al.

[11] Patent Number: 5,116,491
[45] Date of Patent: May 26, 1992

[54] COMPREHENSIVE WATER TREATMENT SYSTEM

[75] Inventors: Earl P. Brane, Hide Away Hills; David L. Tucker, Pickerington, both of Ohio

[73] Assignee: Wm. R. Hague, Inc., Groveport, Ohio

[21] Appl. No.: 782,337

[22] Filed: Oct. 24, 1991

Related U.S. Application Data

[62] Division of Ser. No. 493,896, Mar. 15, 1990.

[51] Int. Cl.⁵ .............................................. B01D 21/30
[52] U.S. Cl. ...................................... 210/143; 210/278
[58] Field of Search ............... 210/278, 143, 277, 275; 137/625.27, 625.67

[56] References Cited
U.S. PATENT DOCUMENTS

| | | | |
|---|---|---|---|
| 2,722,514 | 11/1955 | Sloan | 210/278 |
| 2,902,155 | 9/1959 | Lundeen | 210/278 |
| 2,906,281 | 9/1959 | Pillote | 210/278 |
| 2,962,437 | 11/1960 | Lindsay | 210/278 |
| 3,867,961 | 2/1975 | Rudelick | 210/278 |
| 4,235,718 | 11/1980 | Lopez | 210/278 |

*Primary Examiner*—Stanley S. Silverman
*Assistant Examiner*—Cynthia L. Nessler
*Attorney, Agent, or Firm*—Mueller and Smith

[57] ABSTRACT

In its broadest aspects, a method for the cyclic regeneration of a water softening system disclosed. The water softening system comprises an exchange medium in a tank which is in fluid communication with a brine storage tank. This method comprises the steps of filling the brine storage tank with refill No. 2 of softened water in a quantity sufficient to create sufficient brine for said exchange medium, said brine storage tank already containing refill No. 1 of softened water from a later step of the method. The exchange medium is subjected to backwashing No. 1 with water flowing counter the direction of water flowing therethrough during water softening operations. Next, brine from the brine storage tank is passed through the exchange medium. Water then is passed through the brine exchange tank. The exchange medium thereafter is subjected to backwashing No. 2 with water flowing counter to the direction of water flowing therethrough during the water softening operation. Finally, the brine tank is refilled with refill No. 1 of softened water to create brine in a quantity insufficient for completely brining the exchange medium.

10 Claims, 12 Drawing Sheets

COMPREHENSIVE WATER TREATMENT SYSTEM

This application is a division of application Ser. No. 07/493,896, filed Mar. 15, 1990.

BACKGROUND OF THE INVENTION

The present invention relates to water treatment systems, sometimes commonly known as water softening systems, and more particularly to a unique system comprising a water softening unit, a control system therefor, and its use in commercial/industrial settings.

Resin-type ion exchange devices have many uses, such as the softening of water. As the water to be processed is passed through the resin-filled tank, ions in the fluid to be processed, e.g. calcium, is exchanged with ions found in the resin, e.g. sodium, thereby removing objectionable ions from the water and exchanging them for less objectionable ions found in the resin. During this ion exchange process, the ability of the resin to exchange ions gradually is reduced. That is, the resin bed becomes exhausted and, thereafter, water will flow therethrough in unprocessed form.

The capacity of the ion exchange resin bed can be determined from the volume of resin used and the particular type of resin. The concentration of contaminant(s) in the water to be processed can be determined, at least on an average basis. Thus, the volume of water that can be processed by a particular water treatment unit is known. Once that capacity of water has been treated, the bed must be regenerated.

Regeneration of the ion exchange resins typically involves chemically replacing the objectionable ions from the resin with less objectionable ions, c.g. replacing calcium with sodium ions. This regeneration process requires the suspension of the treatment process, thus necessitating the water to by-pass the ion exchange resin tank. At the same time as the ion exchange resin is regenerated, the bed can be backwashed in order to remove trapped particulate matter, the resin tank can be rinsed to remove objectionable soluble materials, an application of sterilization agent to prevent bacterial growth can be accomplished, etc. All of these operations are known in the art.

In the regeneration of resin beds used to treat hard water, a variety of control modes have been employed commercially. For example, some water softening units function on a timer which necessitates regeneration at specified time intervals. This mode of operation has the disadvantage that the resin bed may have sufficient capacity remaining to continue for quite a time thereafter. Another mode of control involves monitoring the volume of water treated and provoking regeneration once a set point has been reached. Unfortunately, regeneration cycles can be triggered undesirably at just the time when demand for water is high under this mode of operation.

One overriding condsideration regardless of the mode of control employed involves exhaustion of the resin bed. If the resin bed is permitted to become completely exhausted of its capability of exchanging ions, a single regeneration cycle will not be sufficient to establish the original capacity of the bed. Instead, several regeneration cycles often will be required. Moreover, if the bed is near its exhaustion point and a high demand for water is made, present commercial systems cannot provide the capacity to soften the extra water demand without risking total exhaustion of the resin bed. Accordingly, new water treatment systems including the mode of operation thereof are in demand in this field.

BROAD STATEMENT OF THE INVENTION

The present invention has many aspects. In its broadest aspects, a method for the cyclic regeneration of a water softening system is disclosed. The water softening system comprises an exchange medium in a tank which is in fluid communication with a brine storage tank. This method comprises the steps of filling the brine storage tank with refill No. 2 of softened water in a quantity sufficient to create sufficient brine for said exchange medium, said brine storage tank already containing refill No. 1 of softened water from a later step of the method. The exchange medium is subjected to backwashing No. 1 with water flowing counter the direction of water flowing therethrough during water softening operations. Next, brine from the brine storage tank is passed through the exchange medium. Water then is passed through the brine exchange tank. The exchange medium thereafter is subjected to backwashing No. 2 with water flowing counter to the direction of water flowing therethrough during the water softening operation. Finally, the brine tank is refilled with refill No. 1 of softened water to create brine in a quantity insufficient for completely brining the exchange medium.

Another aspect of the present invention is an improved valve assembly which is designed to implement the novel method disclosed above. The improved valve assembly comprises a valve body having a drain port, an inlet water port, softened water outlet port, an injector port, first and second exchange medium tank ports, and first and second injector ports. A piston valve assembly comprises a piston bearing the first and second valve, and is disposed within the valve body. A drive assembly is connected with the piston for reciprocatingly moving the piston within the valve body for the valves to determine the flow of fluid within the valve body. A flow meter is associated with the valve body for measuring water passed through the exchange medium tank. An injector assembly has a first port in fluid communication with the valve body first port which provides fluid communication with the valve body softened water outlet port; a second port in fluid communication with said valve body second port which provides fluid communication with said valve body inlet water port; and a brine storage tank port. The injector second port is in fluid communication with the injector second port through a nozzle whereby water flowing from said injector second port to said injector first port through said nozzle creates a pressure reduction in the injector assembly between said injector second port and said brine storage tank port for drawing brine from said brine storage tank to within said injector assembly and out said injector second port. The piston is movable from a first position wherein water flows from said valve body inlet port to said second exchange medium tank port, and from said exchange medium tank through said first exchange medium tank port and outsaid softened water outlet port; to a second position wherein said valves close fluid communication between said valve body inlet water port and said valve body second exchange medium tank port, opens fluid communication between said valve body second exchange medium tank port and said valve body drain port, and opens fluid communication between said valve body inlet water port and said first exchange medium tank port and said injector second port for water to backwash said exchange medium tank; to a third position wherein said valves only permit fluid communication between said valve body inlet port and said injector second port for water and brine from said brine storage tank to flow from said injector first port to said valve body first exchange tank port, and from said valve body exchange medium tank second port to the valve body drain port; and reciprocatingly movable back to said second and first positions sequentially.

The piston of the novel valve assembly can be driven by a unique helix drive disclosed herein. The helix drive comprises a stationery drive axle bearing a longitudinally slotted sleeve; a piston having an apertured end and being disposed within said drive axle sleeve; a transverse pin, having ends fitted with guide shoes, disposed through said piston aperture and located within said axle slot; and a drive gear having a pair of helix paths within said pin guide shoes are disposed, whereby rotation of said drive gear results in reciprocating longitudinal movement of the pin within the axle slot and, thus, said drive axle.

Advantages of the present invention include a mode of operation that prevents the exchange medium from becoming exhausted by always forcing regeneration when the reserve setting is reached. Another advantage is the ability to soften water on an emergency basis when high demand is specified by always keeping brine in the brine tank. Another advantage is an emergency mode whereby service water bypasses the unit so that the exchange bed can be regenerated prior to its becoming completely exhausted. Yet another advantage is a unique valve assembly system for implementation of the method disclosed herein. Yet a further advantage is a unique helix drive system that can be adapted for use in the novel valve assembly disclosed herein. These and other advantages will be readily apparent to those skilled in the art based upon the disclosure contained herein.

These drawings will be described in detail in connection with the following Detailed Description of the Invention.

DETAILED DESCRIPTION OF THE INVENTION

Figure 1:
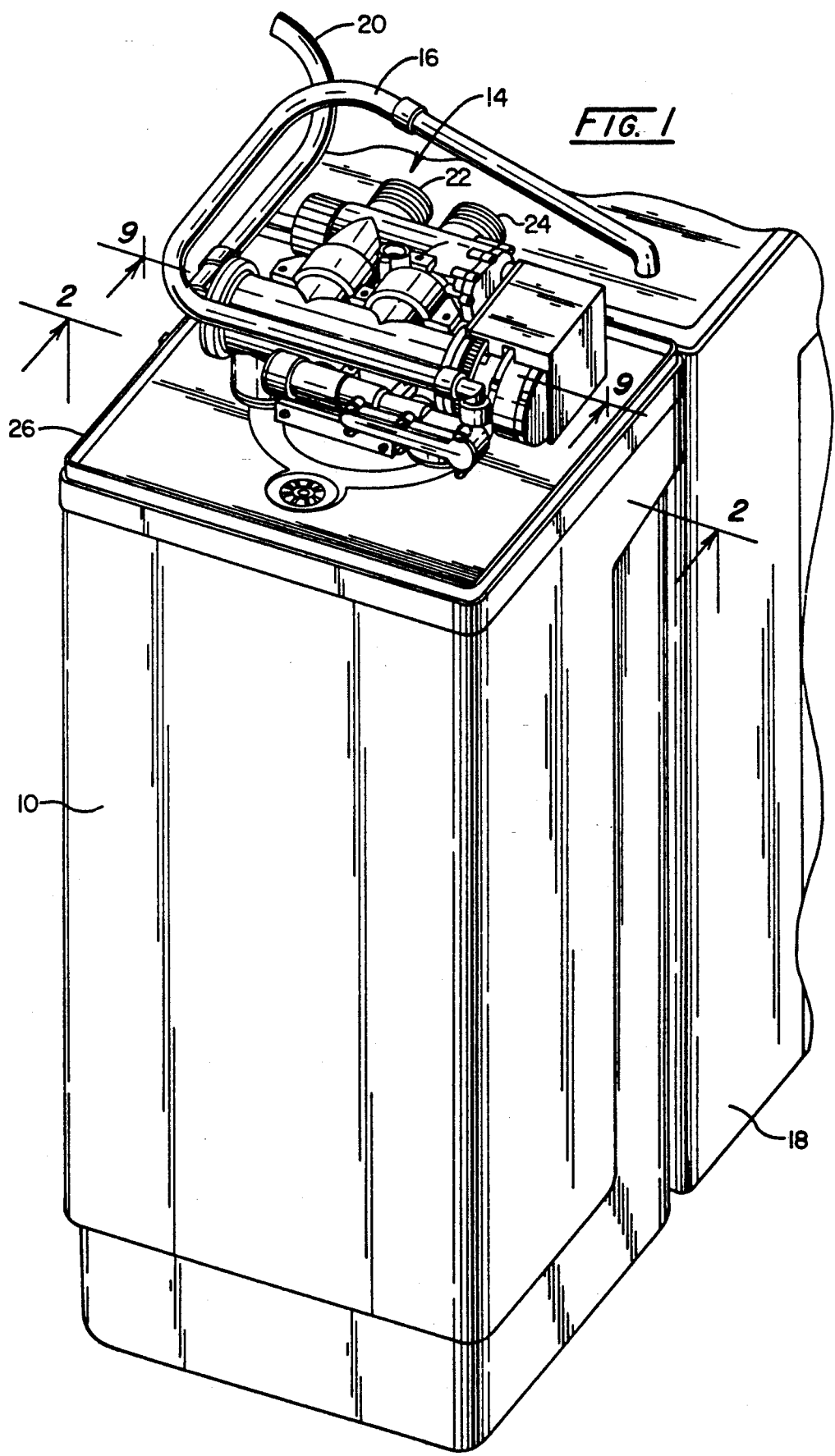
FIG. 1 is a perspective elevational view of the ion exchange resin system including a cabinet which houses the ion exchange resin bed tank and the valve assembly of the present invention.
Figure 2:
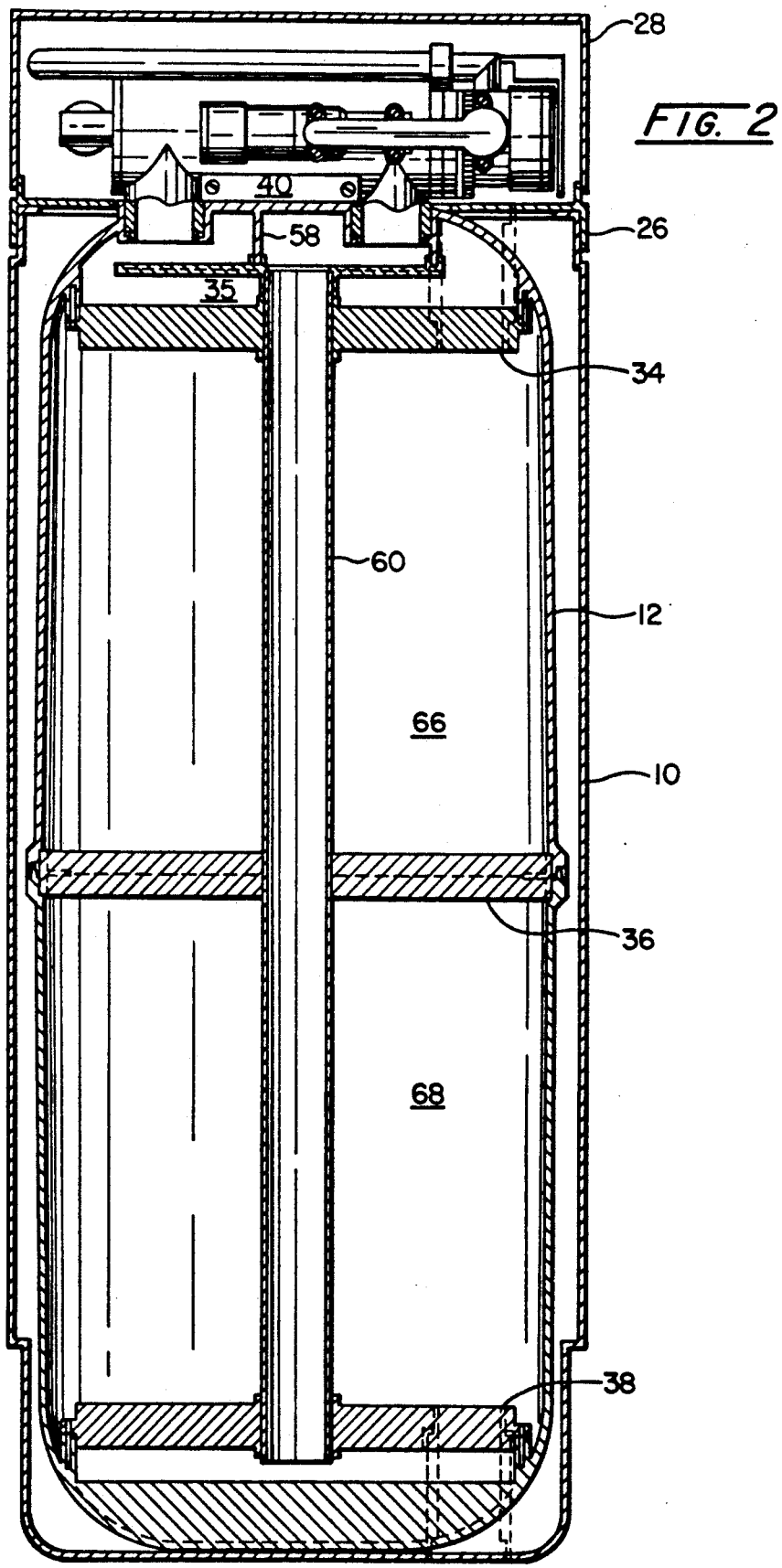
FIG. 2 is a sectional view taken along line 2—2 of FIG. 1.

The water softening unit of the comprehensive water treatment system of the present invention is depicted at FIG. 1. Housed within cabinet 10 is ion exchange medium tank 12. (See FIGS. 2 and 3). Mounted atop tank 12 is valve control assembly 14 which will be described in detail in connection with FIGS. 4-9). Line 16 is for connection to brine storage tank 18 and line 20 is the connection to a drain. Water enters the comprehensive water treatment system through inlet 22 and softened water is withdrawn through outlet 24. Frame 26 (see FIG. 2 also) mounts atop cabinet 10 and retains cover 28 which hides valve control assembly 14.

Figure 3:
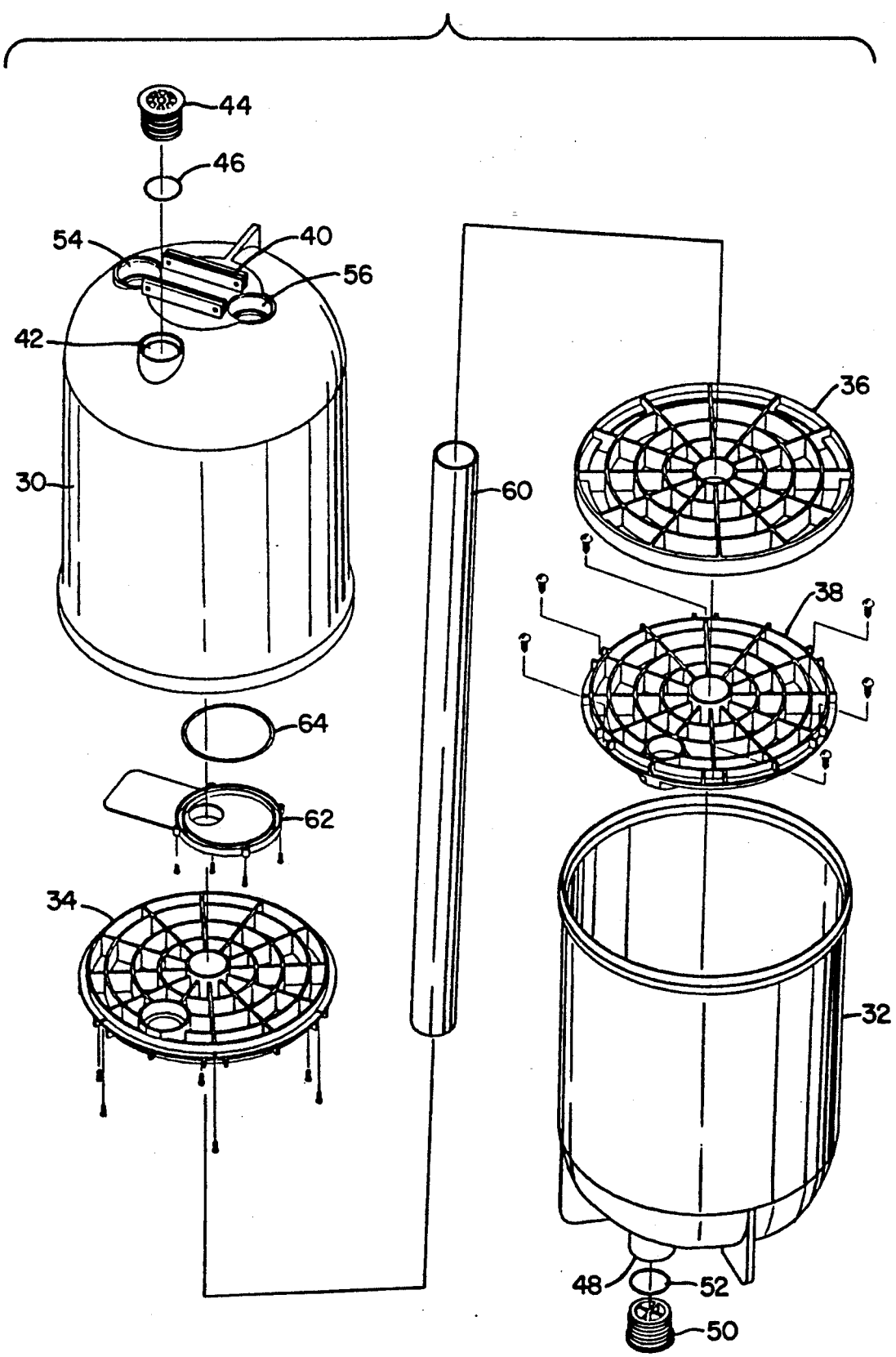
FIG. 3 is an elevational view of the components comprising the exchange medium tank and their assembly.

While exchange medium tank 12 can be made in one or more sections, FIG. 3 depicts it as formed from upper tank section 30 and lower tank section 32. This arrangement permits the insertion of central annular sections to increase the height of tank 12 should it be necessary, desirable, or convenient. Tank 12 is shown fitted with upper screen/distributor 34, center screen/distributor 36, and lower screen/distributor 38. The use of three screen/distributors as shown at FIG. 3 permits different resins or exchange medium beds to be established between distributors 34 and 36, and 34 and 38. Exchange beds also can be located atop distributor 34 and beneath distributor 38, if necessary, desirable, or convenient. It will be appreciated that center screen/distributor 36 may be omitted to establish a single bed. Alternatively, with additional centrally-disposed tank sections with associated screen/distributors, additional beds could be established as is necessary, desirable, or convenient. Head space 35 is provided between upper screen/distributor 34 and the spherical top of upper medium tank section 30. Preferably, head space 35 is filled with media (e.g. 60/80 mesh garnet) capable of filtering particulate contaminants from water passed therethrough. Mounting brackets 40 retain valve control assembly 14. Fill aperture 42 in upper medium tank section 30 can be used to add resin to tank 12 for filling the upper section housed within upper medium tank 30 and can be used for withdrawal of resin by inversion of tank 12. Fill plug 44 and O-ring 46 fill aperture 42 when access thereto is not required. Similarly, lower medium tank section 32 has drain plug 48 which retains lower fill plug 50 and O-ring 52.

Upper medium tank section 30 further has inlet aperture 54 and outlet aperture 56 disposed about its spherical top. Flange 58 (see FIG. 2) projects downwardly from the top of upper medium tank section 30 and provides communication between outlet aperture 56 and center flow tube 60. Apertured plate 62 and associated O-ring 64 mate with flange 58 to provide a cavity in communication with center flow tube 60 that fits through the aperture in plate 62 and, thus, provide an outlet for softened water separate from the head space within upper medium tank section 30 which is filled with service water to be softened as it enters tank 12 via inlet aperture 54. The flow of water admitted via inlet aperture 54 passes sequentially through the garnet media in headspace 35 wherein particulate matter is filtered, through upper screen/distributor 34 through upper resin bed 66, through center screen/distributor 36 and through lower resin bed 68, and finally through lower screen/distributor 38. The water then flows up through center flow tube 60 and into the chamber created by flange 58 and plate 62 for being withdrawn from tank 12 via outlet aperture 56.

Figure 4:
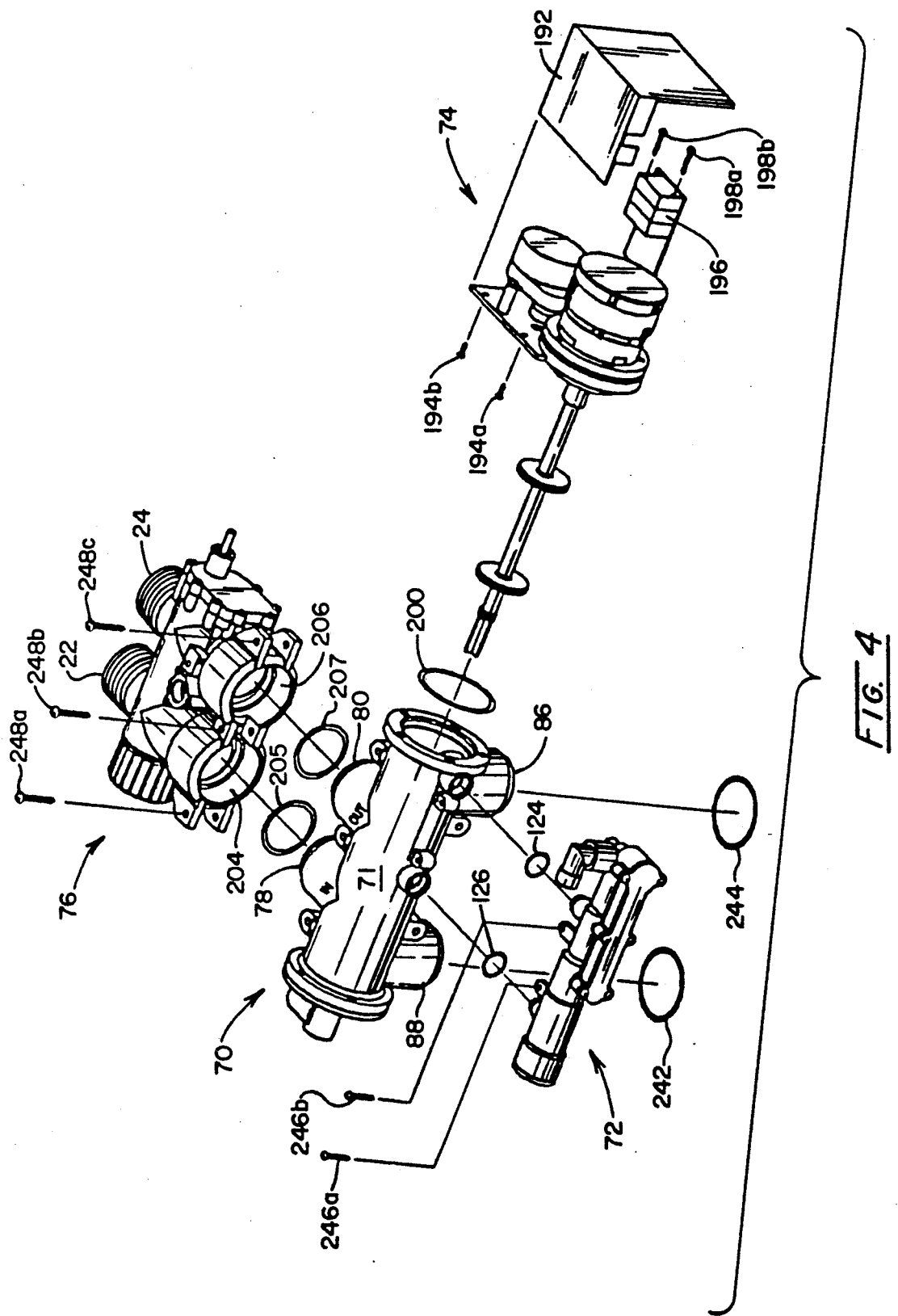
FIG. 4 is a perspective view of the assembly of the valve body, piston valve assembly, injector assembly, and by-pass assembly of the present invention.

Control of the flow of water between exchange medium tank 12, brine storage tank 18, and within exchange medium tank 12 is controlled by valve control assembly 14 which is depicted at FIG. 4. This assembly is composed of valve body 70, injector assembly 72, helix drive assembly 74, and bypass assembly 76. This component and assembly drawing will be referred to in connection with the detailed drawings of each of these assemblies as depicted in other figures.

Figure 5:
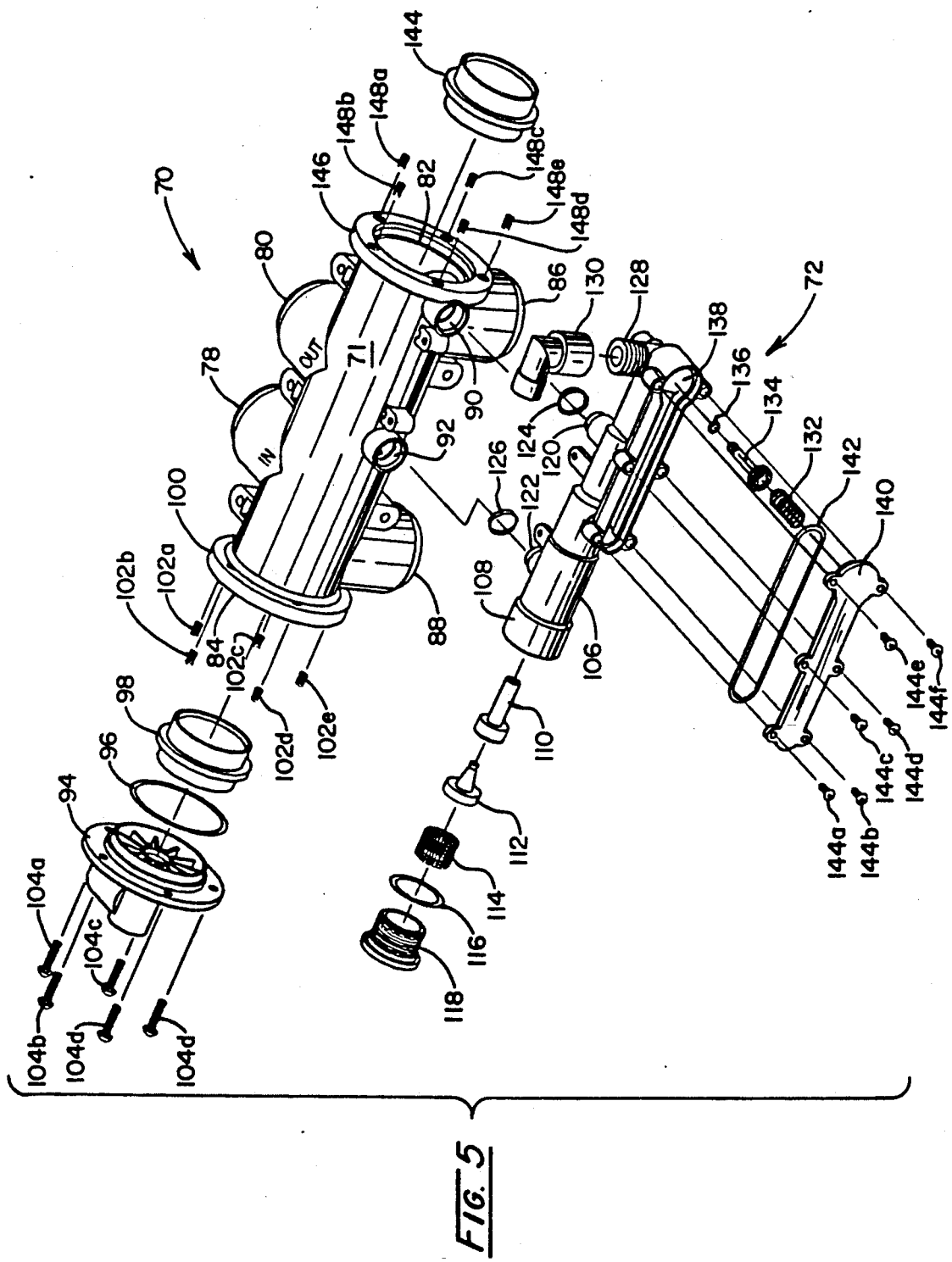
FIG. 5 is a detailed drawing of the components and their assembly for the injector assembly and valve body of FIG. 4.
Figure 6:
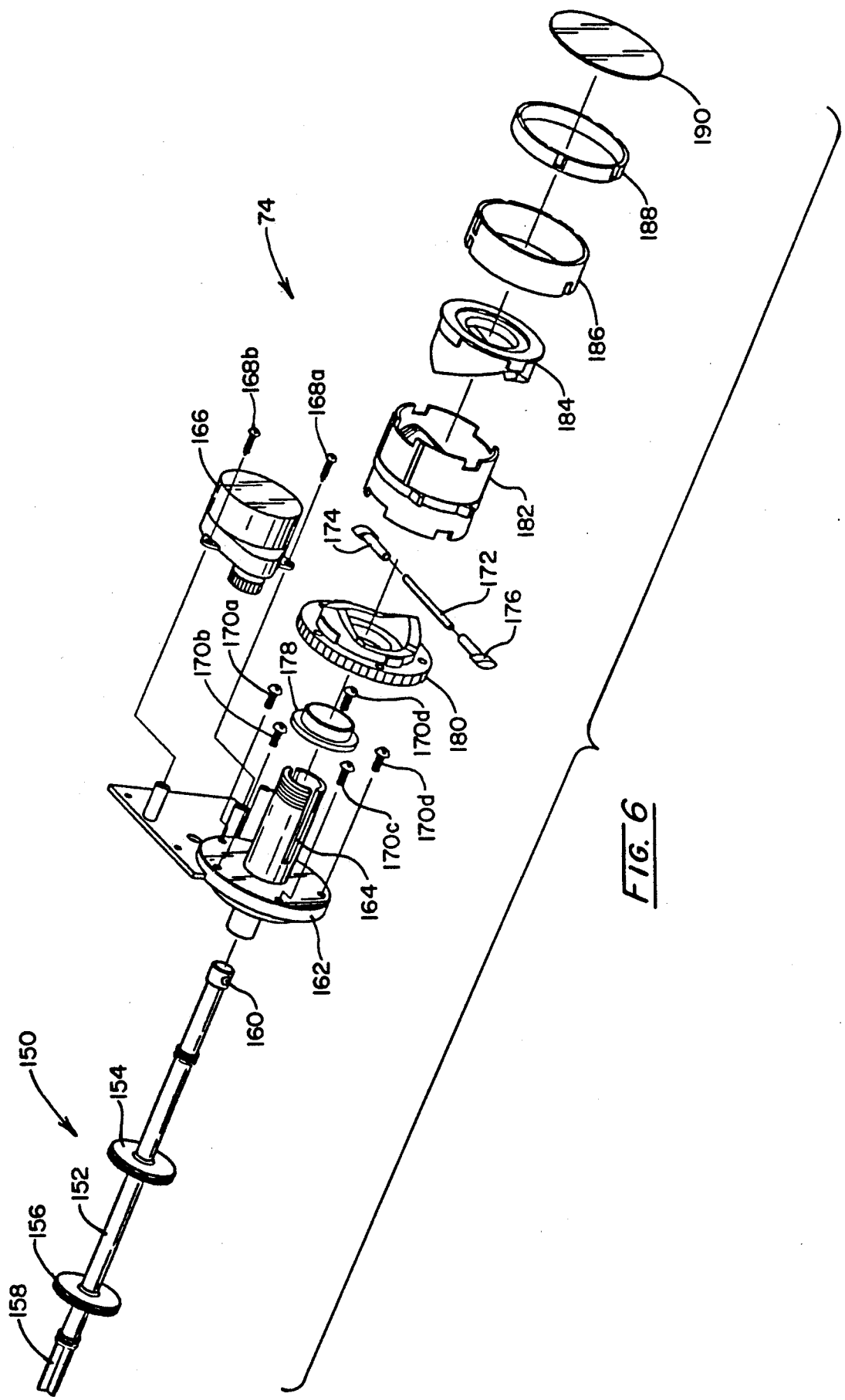
FIG. 6 is a detailed drawing of the components and their assembly of the piston valve assembly of FIG. 4.

Referring to FIG. 5, valve assembly 70 and injector assembly 72 are seen in detail. Valve body 71 is seen to have eight ports: water inlet port 78, softened water outlet port 80, helix drive port 82, drain port 84, first exchange medium tank port 86, second exchange medium tank port 88, first injector port 90, and second injector port 92. End cap 94, with O-ring 96 and cylinder insert 98 connects to flange 100, which retains threaded inserts 102a-102e, by bolts 104a-104e. Line 20 (FIG. 1) connects to end cap 94.

Injector assembly 62 is seen to be comprised of injector housing 106 which has internally threaded end 108 into which fits throat 110, nozzle 112, screen 114, O-ring 116, and threaded plug 118. Injector housing 106 further has first ports 120 and second port 122. First injector port 120 mates with first valve body port 90 with intervening O-ring 124 therebetween. Second injector port 122 mates with second valve body port 92 with O-ring 126 disposed therebetween. Threaded sleeve 128 is connected to elbow 130 which serves as the brine tank port for injector 72 and is connected to line 16 (see FIG. 1). Disposed within injector housing 106 and in the aperture formed by threaded sleeve 128 is spring 132, poppet 134, and O-ring 136. This spring assembly is inserted into injector housing 106 via elongate aperture 138 and is sealed to the outside by elongate cover 140 with intermediately disposed O-ring 142. Cover 140 is retained to injector housing 106 by threaded bolts 144a-144f.

Referring to valve assembly 70, cylinder insert 144 (FIG. 5) fits into aperture 82 which is surmounted by flange 146 which contains threaded inserts 148a-148e. Valve assembly 150 is comprised of piston 152 which retains first valve 154 and second valve 156. One end of piston 52 is terminated by crucifix 158 which fits into valve body end cap 94 and is terminated at the other end by transverse aperture 160. Drive axle 162 bears longitudinally slotted sleeve 164 and has mounts for mounting motor 166 with screws 168a and 168b. Drive axle 162 itself is mounted to valve body flange 146 by bolts 170a-170e. The apertured end of piston 152 fits through drive axle 162 and slotted sleeve 164. Cross pin 172 with guide shoes 174 and 176 fits through aperture 160 and rides in the longitudinal slot in slotted sleeve 164. Slotted sleeve 164 permits piston 152 to move in a longitudinal direction only.

The helix drive unit (FIG. 6) that provides reciprocating movement of piston 152 includes bushing 178, helix drive gear 180, helix drive center 182, and helix drive end 184. Switch ring double 186, switch ring single 188, and bushing thrust washer 190 complete the helix drive assembly. Referring to FIG. 4, motor cover 192 attaches to the motor mount flange of drive axle 162 with screws 194a and 194b. Junction printed circuit board (PCB) 196 similarly is attached with screws 198a and 198b. O-ring 200 completes the waterproof seal established between helix drive assembly 74 and valve body 70.

Figure 7:
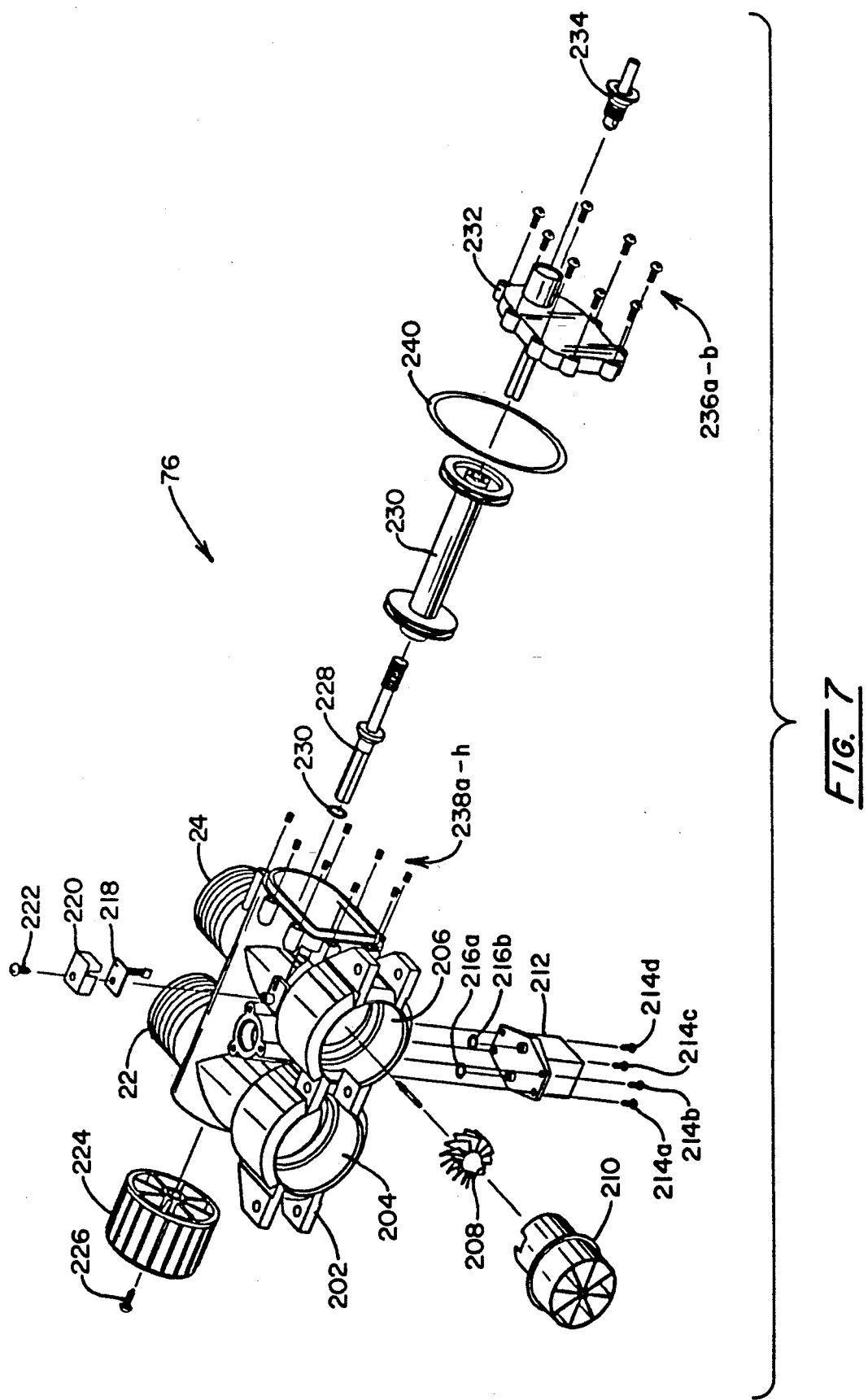
FIG. 7 is a detailed drawing of the components and their assembly of the bypass assembly of FIG. 4.

Referring now to bypass assembly 76 depicted in detail at FIG. 7, bypass housing 202 has water inlet port 204 that connects to valve body inlet port 78 and water outlet port 206 that connects to valve body outlet port 80. O-rings 205 and 207 seal port 204 to valve body inlet port 78 and port 206 to valve body outlet port 80, respectively (see also FIG. 4). Turbine 208 is retained in port 206 by flow director 210. Mounted in conjunction therewith is pressure differential switch 212, mounted with screws 214a-214d and O-rings 216a and 216b, and turbine sensor PCB 218 retained by sensor cap 220 and screw 222. Switch 212 permits the pressure drop across the resin beds to be monitored based on the inlet and outlet water pressures. If this value is too great, likely the resin bed(s) is clogged and the water softening system is shut out, i.e. full by-bass mode is established. The turbine sensor assembly provide flow metering of the softened water exiting the system. Full bypass of water is achieved using bypass assembly 76 by activating rotating handle 224 which is affixed to bypass housing 202 by screw 226. Handle 224, in turn, is attached to drive shaft 228 which accommodates O-ring 230 therebetween. Drive shaft 228, in turn, screws into piston assembly 230 which is connected at its other end to end cap 232. End cap 232, in turn, retains valve test port 234. End cap 232 is attached to bypass housing 202 by screws 236a-236h which screw into threaded inserts 238a-238h which are retained by bypass housing 202. O-ring 240 completes the seal established between end cap 232 and bypass housing 202.

Finally, O-rings 242 and 244 provide sealing engagement between first and second tank ports 86 and 88, and inlet 54 and outlet 56, respectively, of upper medium tank section 30. Injector assembly 72 is affixed to also to upper medium tank section 30 by screws 246a and 246b. Bypass housing 76 is retained by screws 248a-248c. Thus, completes the assembly of valve control assembly 14.

Figure 8:
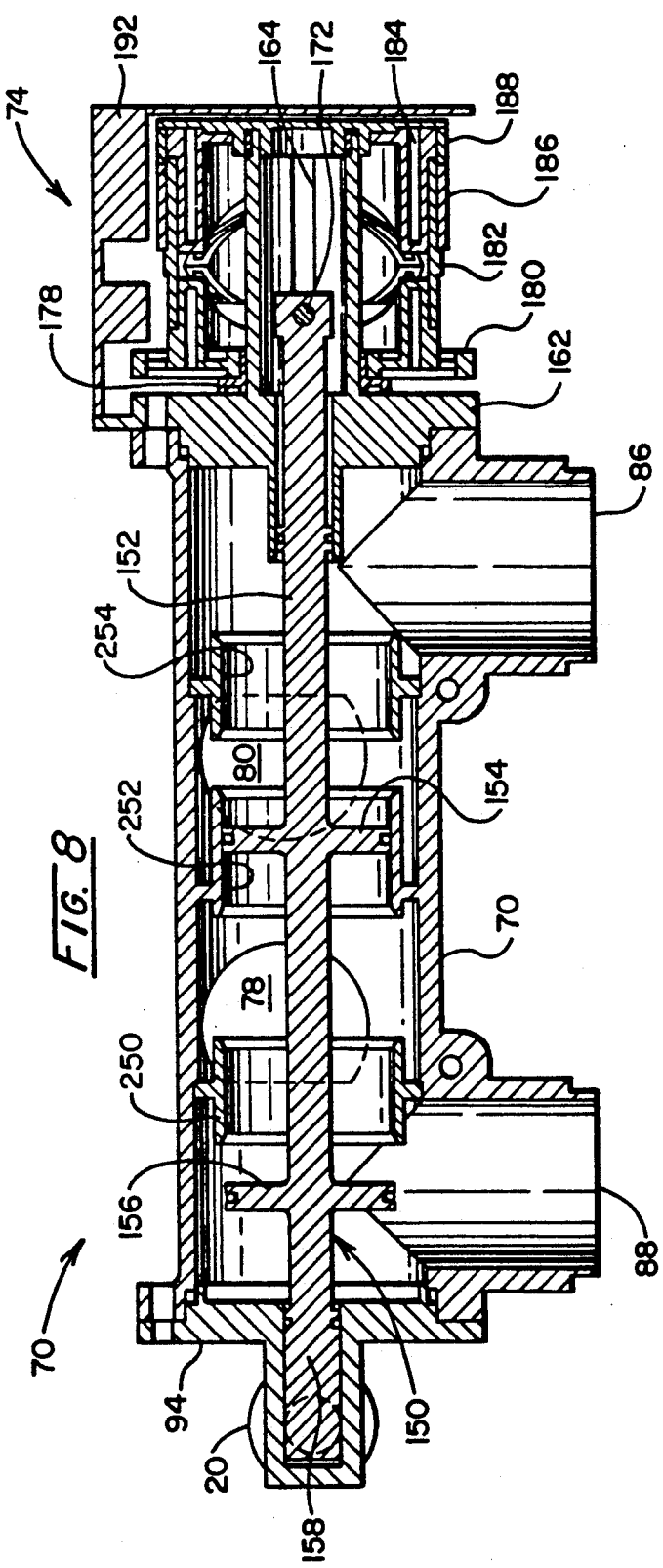
FIG. 8 is a sectional view taken along line 8—8 of FIG. 1.
Figure 9:
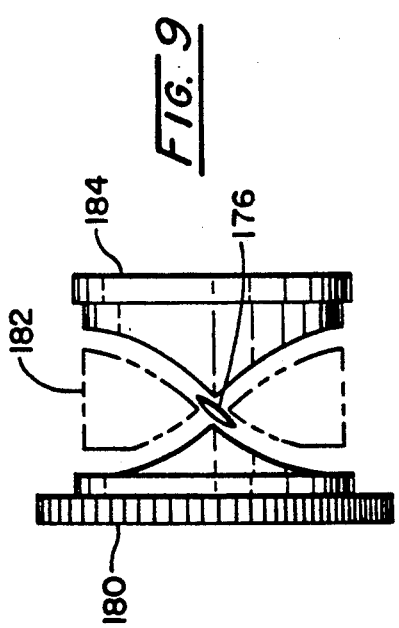
FIG. 9 is a side view of the helix drive components which provide reciprocating longitudinal movement of the piston set forth in FIG. 8.
Figure 10:
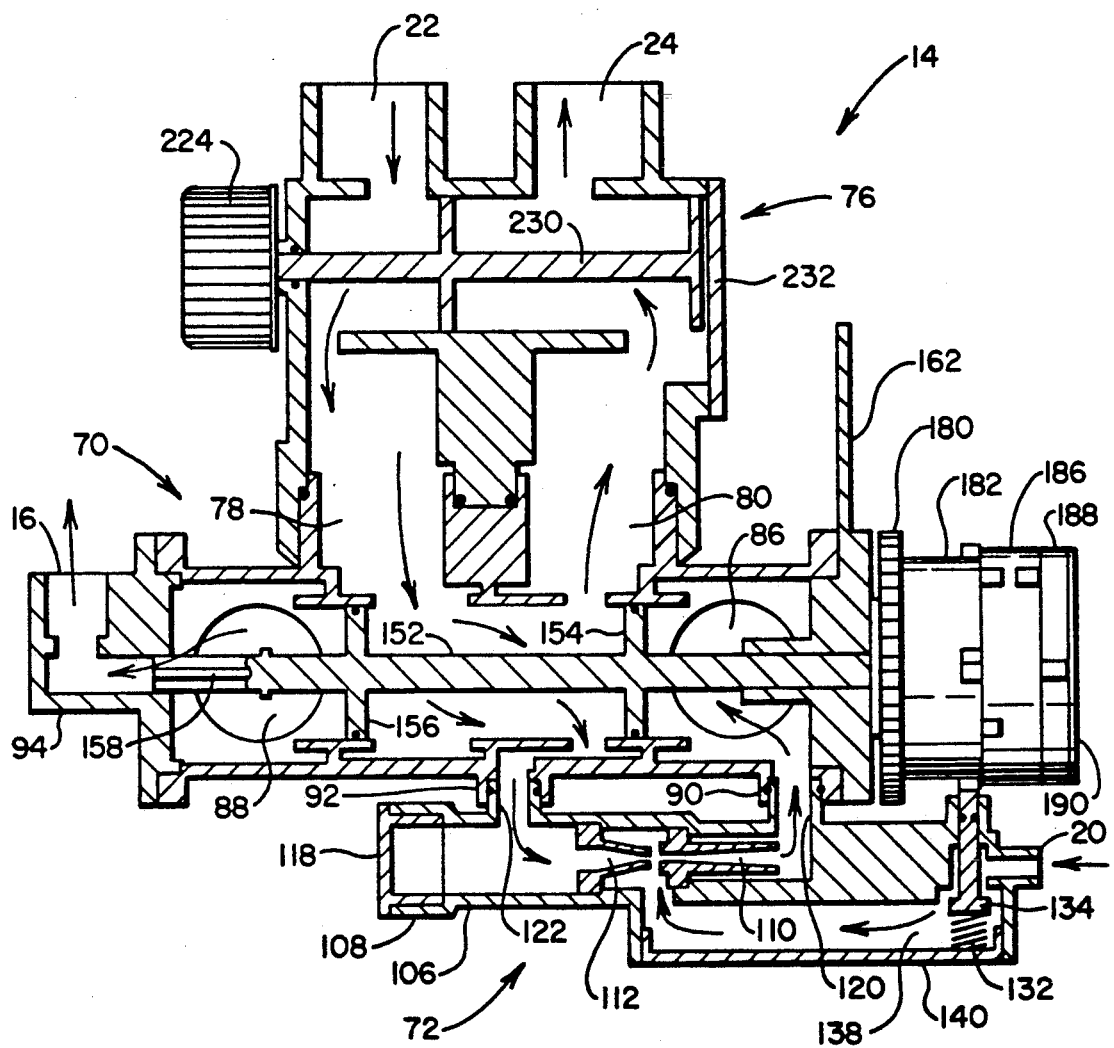
FIG. 10 is a cut-away view of the valve control assembly showing the flow of water and brine therethrough.

As to operation of valve control assembly 14, reference is made to FIGS. 8-10. Piston valve assembly 150 disposed within valve body 70 has three distinct positions to which valves 156 and 154 are brought. Junction PCB 196 in conjunction with switching 186 and 188 provides a stopping point when each of these three positions is reached and, thus, permits motor 166 to be deactivated, as will be more particularly described below. The position of piston valve assembly 150 depicted in FIG. 8 is the normal operational mode wherein service water to be softened enters valve body 70 via inlet port 78 and passes through second tank port 88 into tank 12 to be softened. Valve 154 is in contact with valve seat 252 and, thus, prevents the water from flowing past first valve 154. Similarly, drain line 20 is blocked by O-ring 230 at the crucifix end of piston 152. Softened water is withdrawn from exchange medium tank 12 via first tank port 86 and out of valve body 70 via outlet port 80, first valve 154 again preventing the water from flowing therepast due to its seating against valve seat 252. In this normal operational mode, second valve 156 performs no function. Motor 166 causes center helix drive 182 to rotate its valve actuating surface (e.g. by camming action) into contact with poppet valve 134 to open elbow 130 and permit softened water to flow out threaded sleeve 128, elbow 130, into line 16, and finally into brine storage tank 18. All brine created in tank 18 is with softened water. Next, motor 166 drives piston 152 to a position whereat second valve 156 seats against valve seat 250. This opens drain line 20. First valve 154, however, still is in contact with valve seat 252. The new position of second valve 156 prevents service water entering valve body inlet port 78 from flowing to valve body second tank port 88. Instead, the position of first valve 154 permits service water to now flow out valve body second injection port 92 and thence into injector housing 106. A portion of the water also flows out injector first port 120 into valve body 70 and out valve body first tank port 86 into exchange medium tank 12, but in the direction opposite the normal flow established during softening of inlet service water. This is the so-called "backwash" that is conventionally known in the art. The backwash cycle permits suspended solids and foreign matter to be washed from the garnet bed and ion exchange resin housed within exchange medium tank. This backwash of water passes through valve body second tank port 88 and out drain line 20. Double switch ring 186 and single switch ring 188 permit timing by the controls for the duration of all cycles by carrying seven three-bit binary numbers that provide feedback to the microprocessor establishing the precise position of piston 152 and, hence, the precise cycle and flow of water in valve control assembly 14. Detents in switchings 186 and 188 engage switches on junction PCB 196 and form the binary number, though lands or other indicia could be used.

When this cycle has been completed, piston 152 again traverses to a position whereat second valve 156 still retains contact with valve seat 250, but now first valve 154 is seated against valve seat 254. In this position, the flow of service water entering valve body inlet port 78 and out valve body second injection port 92 is of such a sufficient velocity as it passes through nozzle 112, that a partial vacuum is established within injector housing 106 in communication with threaded sleeve 128. Poppet 134 is moved to an open position by the camming action of drive 182 so that this partial vacuum sucks brine water from brine tank 18 back through line 16 and into injector housing 106 to be mixed with service water passed through injector first port 122 into valve body 70 and thence out valve body first tank port 86. This "brining" or reverse ion exchange refreshes the ion exchange resin and restablishes its initial capacity for softening water. The effluent is withdrawn from exchange medium tank 12 through valve body second tank port 88 and out drain line 20. Again, when the timer indicates that this cycle has been completed, piston 152 reciprocates in the opposite direction and each of these operations sequentially is conducted again, but now in the reverse order. That is, at the next or middle position, the ion exchange resin is backwashed. Thereafter, piston 152 is moved back to the position depicted at FIG. 8 and water softening is recommenced. Finally, softened water again is permitted to flow into brine storage tank 18. During the brining operation, a flow of water directly between valve body inlet port 78 and outlet port 80 is established so that no loss of service is experienced.

The reciprocating movement of piston 152 is determined by helix drive assembly 74, particularly as it relates to helix drive gear 180, helix drive center 182, and helix drive end 184. Referring more particularly to FIG. 9, it will be observed that guide shoe 176 is disposed in the helix path canted in one direction. Not shown in FIG. 9 is guide shoe 174 that is disposed opposite guide shoe 176. These guide shoes follow the double helix path. Since, however, cross pin 176 has only one degree of freedom of movement, viz. in the slot of slotted sleeve 164, cross pin 172 guided by guide shoes 174 and 176 can only move longitudinally in the direction of piston 152 as the helix drive rotates powered by motor 166. A simple, yet highly efficient and reliable reciprocating motive system for piston 152, thus, is disclosed.

Figure 11:
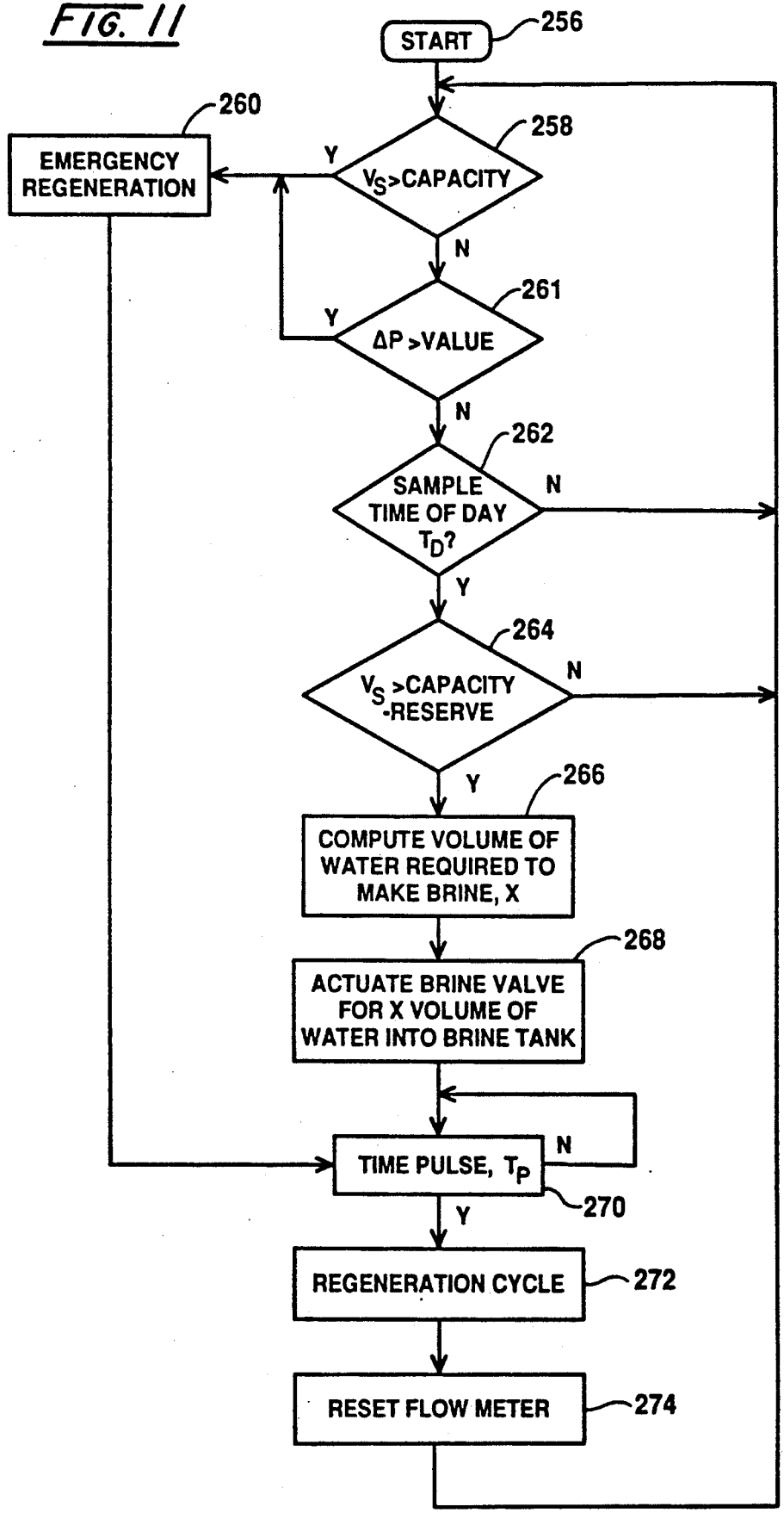
FIG. 11 is a flow diagram for the electronic control means used in conjunction with the water softening system of the present invention.

The operation of valve control assembly 14 is controlled by a microprocessor that contains a program that will be described below in connection with FIG. 11. Initially, however, data must be entered into the program in order to calculate the RESERVE for the system. The water treatment system of the present invention maintains a reserve capacity in order to prevent the resin bed from becoming completely exhausted. Preferably, this reserve is equal to one day's average use of water, though other time periods can be selected as in necessary, desirable, or convenient. In order to calculate the RESERVE, the "grain capacity" of the resin tank must be entered (this is dependent upon the quantity of resin in the tank and the composition of the resin), the hardness of the water to be treated is entered; the number of people in the family being served by the water treatment system is entered; the average consumption of water, gallons/day, is embedded in the software, though it could be a variable which also is entered; and the computer then calculates the RESERVE. As an example, assume that the capacity of tank 12 is 23,000 grains, the hardness of the water to be treated is 10 grains/gallon, the family comprises four persons, and the average comsumption is 75 gallons/day/person. The total capacity of tank 12 is 2300 gallons and one day's RESERVE is equal to 300 gallons. The volume of water intended for softening prior to regeneration, $V_s$, then is equal to 2,000 gallons. The time of day that the computer samples the status of the system additionally can be a variable, or it can be preset in the computer, e.g. conveniently to 12 o'clock p.m.

With the foregoing information entered into the computer, the computer program starts at block 256. Since the system is designed to prevent complete exhaustion of the resin bed in tank 12, the initial step of the computer program at block 258 looks to see whether the volume of water softened exceeds the calculated capacity, $V_s$, of the resin bed(s) in tank 12. In the hypothetical set forth above, the capacity has been calculated to equal 2,000 gallons. If the program determines that this capacity has been exceeded, the program proceeds to block 260 wherein regeneration of the resin bed is commenced immediately, regardless of time of day. The computer program at block 261 also looks to see the pressure differential, P, between the incoming hard water and the outgoing softened water. If P exceeds a given value for the system, it is assumed that the resin beds are clogged and emergency regeneration also is required. The regeneration of the resin bed is accomplished with the water treatment system as described in connection with the previous drawings. These are override situations that occur at blocks 258 and 261 in the program and are unique features of the present invention.

If the volume of water softened, $V_s$, has not exceeded the capacity of the system and the pressure differential has not exceeded the target value, the computer program proceeds to block 262 wherein the time of day, $T_d$, is sampled. As noted above, this time can be set by the user, or can be embedded in the computer program. Midnight is a convenient time for sampling the system since it is a likely time that no water demand is made on the water treatment system. If the set time of day has not been reached, then the program returns to block 258. If, however, the sample time of day has been reached, then the computer program continues to block 264 wherein the program again looks to see whether the design capacity of the system, viz 2,000 gallons in the example above, has been reached. In other words, the program looks to see whether the water treatment system has entered the RESERVE capacity set for the resin bed. If this value has not been reached, then the program returns to block 258.

If the program determines that the resin bed is operating in the RESERVE portion of the bed, then the computer program continues to block 266 wherein the computer calculates the volume of water required to be added to brine storage tank 18 in order to make sufficient brine to regenerate the resin bed and re-establish its initial capacity. Since the volume of water passed through the resin bed can vary, this step of the computer program ensures that only the minimum amount of brine required to exchange with the resin bed is used. Since the regeneration sequence of the present invention always retains a fraction of the brine performed in brine storage tank 18, only the volume of water needed to bring the brine up to the required volume needs to be added. Once the volume of water is calculated at block 266, the computer program proceeds to block 268 wherein motor 166 is actuated for rotating the helix drive so that the camming action of center helix drive 182 activates poppet 134 to permit the computed volume of water to flow into brine storage tank 18. Next, motor 166 is actuated for moving piston 152 disposed in valve body 70 to backwash the resin in exchange medium tank 12. The program then proceeds to block 270 wherein a time pause or delay, $T_p$, is encountered. This delay permits sufficient time for the water passed into brine storage tank 18 to dissolve sufficient brine to establish a brine solution adequate for treatment of the resin in exchange medium tank 12. A conventional time pause is two hours, which means that the regeneration of the resin bed normally will occur at 2:00 a.m. in accordance with step 272 of the computer program. It will be observed that under the emergency regeneration mode of operation at block 260, the time pause at block 270 also is encountered. Following regeneration of the resin bed, the program proceeds to step 274 wherein the accumulated volume of water softened is reset to zero. The program then returns to block 258 of the program.

Figure 12:
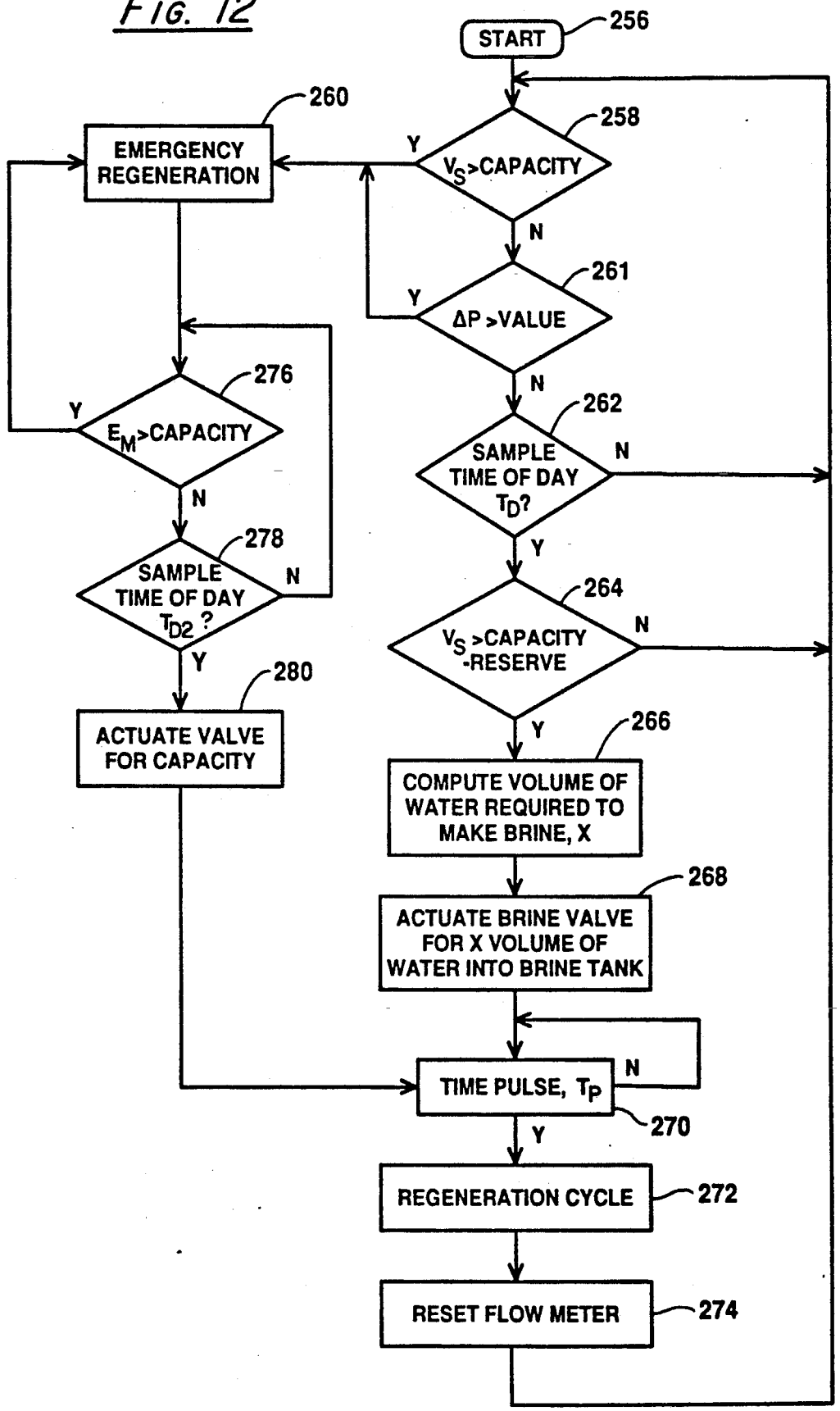
FIG. 12 is an alternative flow diagram to that set forth at FIG. 11.

The emergency regeneration carried out at block 260 of the computer program calls for the bed to be regenerated with the brine present in brine storage tank 18 by virture of refill No. 1. Following this partial regeneration of the resin bed, refill No. 1 is set for the full capacity of the resin bed and refill No. 2 is omitted. At $T_d$, the full amount of brine in brine storage tank 18 then is used to regenerate the bed. Depending upon the amount of water that has been used between the time at which the emergency regeneration was executed and the normal regeneration time, $T_d$, this sequence under emergency regeneration may result in the overbrining of the bed. Alternatively, an extra demand of water thereafter could result in the capacity of the resin bed being exceeded again before reaching the appropriate standard regeneration time of day, $T_d$. Accordingly, the alternative computer program depicted at FIG. 12 modifies the emergency regeneration sequence. Following the emergency regeneration at step 260, the program proceeds to block 276 wherein the volume of water softened again is monitored to see whether it has exceeded the capacity of the system, viz 2300 gallons in the example used herein. If this capacity again has been exceeded, then the program returns to step 260 wherein emergency regeneration again is executed. If, however, the full capacity of the resin bed has not been exceeded, the computer program continues to block 278 wherein the time of day again is sampled. This time of day may or may not be the same time that standard regeneration at block 262 utilizes. If this sample time of day at block 278 has not been reached, then the program returns to block 276 for monitoring the capacity of water passed through the water treatment system again. If the sample time of day has been reached, then the program continues to step 280 wherein valve control assembly 14 is activated for filling brine storage tank 18 with sufficient water to completely brine the resin bed and the program continues to block 270.

Figure 13:
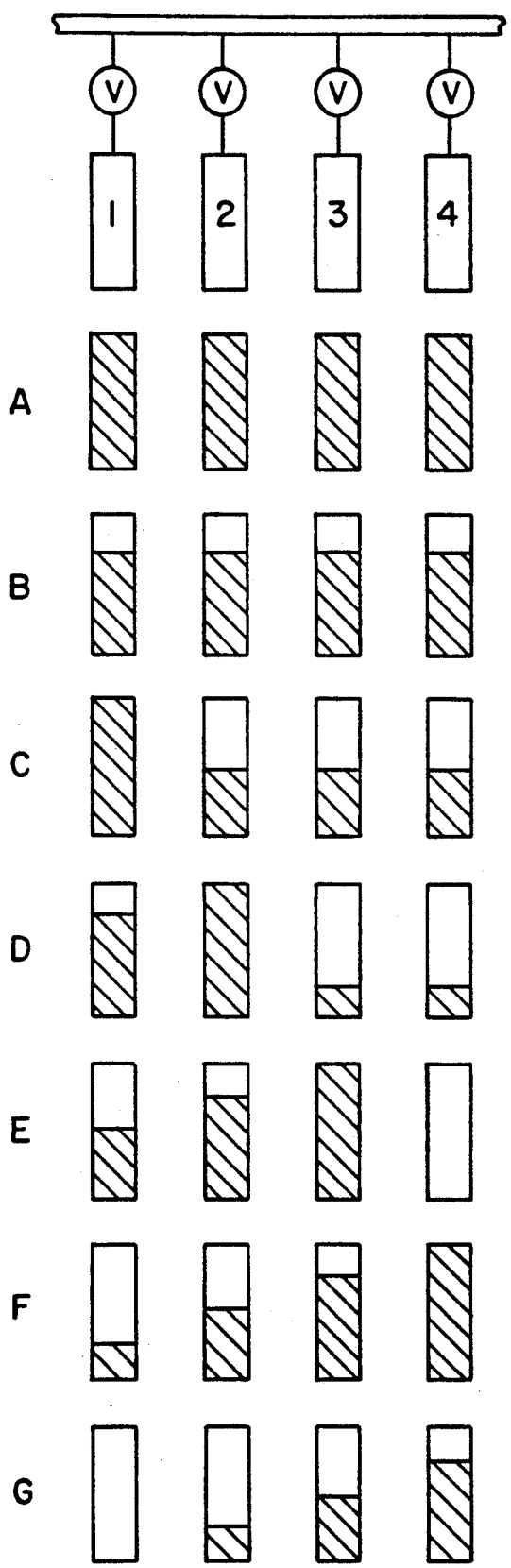
FIG. 13 is a schematic representation of a plurality of water softening units and their mode of operation in a single system.

When a plurality of the comprehensive water treatment systems are to be used in a commercial or industrial setting wherein large capacities of water need to be softened, the operational sequence as illustrated at FIG. 13 may be used. Merely for illustrative purposes, five units were chosen to be depicted at FIG. 13. It will be appreciated that a greater or lesser number of units may be combined in parallel operation as illustrated at FIG. 13. Again, it is mandatory that none of the units have a quantity of water passed therethrough so that the resin bed is completely exhausted. Since no two water treatment units will express the same pressure differential thereacross, and hence the same volumetric flow of water, it is not safe to assume that one-fifth of the flow of water will be passed through each of the five units when they are operated in parallel. If this assumption were made, the operator takes a definite risk that one of the units will preferentially exhibit a lower pressure differential thereacross and, hence, it could be operated to exhaustion. Thus, this operational mode of the present invention always ensures that no tank will be depleted. As an alternative, the regenerated tank, for example, could be held off-line which would provide at least one tank in reserve should an emergency situation arise.

With the four water softening units illustrated at FIG. 13 at the top, each unit starts with a complete resin bed as illustrated at A. Five regeneration cycles then are depicted at C-G. In order to establish the sequence for the meter demand set point, the capacity of the smallest of the four units is divided by the number of units. In the illustration at FIG. 11 with equal capacity units, the capacity of any one unit would be divided by four. Say, that each unit is capable of softening 120 gallons of water. This capacity divided by the number of units makes the set point at 30 gallons. This means that units 1-4 on the average will soften each 30 gallons. One or more of the units may be above or below this average figure. When this capacity has been first reached by any of the units, unit 1 then is regenerated. The choice of tank 1 is arbitrary. Any unit could have been selected, not necessarily the unit that triggered regeneration. When unit 1 has been regenerated, it is immediately placed back in service. The counter is reset to zero at the onset of regeneration. Monitoring of when any unit reaches 30 gallons again is commenced. At cycle D when 30 gallons again is first reached by any unit, sequentially tank 2 is regenerated and the remaining units continue to soften the water. By the time that cycle E is reached, the only unit not to be regenerated, unit 4, has run through four cycles of water softening. Since on the average each cycle involves the softening of 30 gallons, its capacity has not been reached and at cycle F, it is withdrawn for regeneration. The cycle then commences again at G. While this example is based on 4 units, it will be understood that other numbers could be used to calculate the regeneration set point. Of importance is the operation in a mode whereby complete exhaustion of any one unit is avoided. By basing regeneration on the smallest capacity unit, uneven capacity units also can be used as is necessary, desirable, or convenient.

I claim:

1. In a water softening system of an exchange medium tank, a brine storage tank in fluid communication therewith, and a valve assembly for controlling fluid flow of said system, the improvement wherein said valve assembly comprises:
   (a) a valve body having a drain port, an inlet water port, a softened water outlet port, an injector port, first and second exchange medium tank ports, and first and second injector ports;
   (b) a piston valve assembly comprising a piston bearing a first and a second valve, and being disposed within said valve body; a drive assembly connected with said piston for reciprocatingly moving said piston within said valve body for said valves to determine the flow of fluid within said valve body;
   (c) a flow meter for measuring water passed through said exchange medium tank;
   (d) an injector assembly having a first port in fluid communication with said valve body first port which provides fluid communication with said valve body softened water outlet port, a second port in fluid communication with said valve body second port which provides fluid communication with said valve body inlet water port, and a brine storage tank port; said injector first port being in fluid communication with said injector second port through a nozzle whereby water flowing from said injector second port to said injector first port through said nozzle creates a pressure reduction in the injector assembly between said injector second port and said brine storage tank port for drawing brine from said brine storage tank to within said injector assembly and out said injector second port; said piston movable from a first position wherein water flows from said valve body inlet port to said second exchange medium tank port, and from said exchange medium tank through said first exchange medium tank port and out said softened water outlet port; to a second position wherein said valves close fluid communication between said valve body inlet water port and said valve body second exchange medium tank port, opens fluid communication between valve body second exchange medium tank port and said valve body drain port, and opens fluid communication between said valve body inlet water port and said first exchange medium tank port and said injector second port for water to backwash said exchange medium tank; to a third position wherein said valves only permit fluid communication between said valve body inlet port and said injector second port for water and brine from said brine storage tank to flow from said injector first port to said valve body first exchange medium tank port, and from said valve body exchange medium tank second port to the valve body drain port; and reciprocatingly movable back.

2. The system of claim 1 wherein a pressure differential switch is connected between said valve body inlet water port and said valve body softened water outlet port.

3. The system of claim 1 wherein said drive assembly connected with said piston comprises a stationary drive axle bearing a longitudinally slotted sleeve, said piston has an apertured end and is disposed within said drive axle sleeve;
   a transverse pin, having ends fitted with guide shoes, is disposed through said piston aperture and is located within said axle slotted sleeve; and
   a drive gear having a pair of helix halves within which said pin guide shoes are disposed, whereby rotation of said drive gear results in reciprocating longitudinal movement of said pin within said axle slotted sleeve and, thus, said drive axle.

4. The system of claim 1 wherein said exchange medium tank is multi-compartmented.

5. The system of claim 4 wherein at least one of said compartments contains said ion exchange medium and another of said compartments is filled with particles for filtering particulate contaminants from water passed therethrough.

6. The system of claim 5 wherein said inert particles comprise garnet particles.

7. The system of claim 1 wherein a spring biased poppet is disposed in said injector assembly brine storage tank port.

8. The system of claim 7 wherein said drive assembly connected with said piston comprises a stationary drive axle bearing a longitudinally slotted sleeve, said piston has an apertured end and is disposed within said drive axle sleeve;
   a transverse pin, having ends fitted with guide shoes, is disposed through said piston aperture and is located within said axle slotted sleeve and
   a drive gear having a pair of helix halves within which said pin guide shoes are disposed, whereby rotation of said drive gear results in reciprocating longitudinal movement of said pin within said axle slotted sleeve and, thus, said drive axle.

9. The system of claim 8 wherein said drive gear exterior has a camming surface in contact with said poppet for opening of said injector assembly brine storage tank port.

10. The system of claim 9 wherein an electronic controller is in electrical connection with a plurality of switches, the exterior surface of said drive gear additionally containing a pattern of detents that are in contact with said switches, said pattern feeding back the location of said piston thereby.

* * * * *